US012777133B2

(12) United States Patent
Chen et al.

(10) Patent No.: US 12,777,133 B2
(45) Date of Patent: Oct. 27, 2026

(54) SYSTEMS, METHODS, AND NON-TRANSITORY COMPUTER-READABLE MEDIUM FOR SHARING CAMERA VIEWS

(71) Applicant: Toyota Motor Engineering & Manufacturing North America, Inc., Plano, TX (US)

(72) Inventors: Yitao Chen, Mountain View, CA (US); Dawei Chen, Mountain View, CA (US); Haoxin Wang, Mountain View, CA (US); Kyungtae Han, Mountain View, CA (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 397 days.

(21) Appl. No.: 18/073,839

(22) Filed: Dec. 2, 2022

(65) Prior Publication Data

US 2024/0187555 A1 Jun. 6, 2024

(51) Int. Cl.

*H04N 7/18* (2006.01)
*G01C 21/00* (2006.01)
*G01C 21/36* (2006.01)

(52) U.S. Cl.

CPC ......... *H04N 7/181* (2013.01); *G01C 21/3691* (2013.01); *G01C 21/3893* (2020.08); *G01C 21/3896* (2020.08)

(58) Field of Classification Search

CPC ................ H04N 7/181; G01C 21/3893; G01C 21/3896; G01C 21/3691

USPC .......................................................... 348/148

See application file for complete search history.

(56) References Cited

U.S. PATENT DOCUMENTS

| | | | | |
|---|---|---|---|---|
| 6,289,278 | B1 | 9/2001 | Endo et al. | |
| 6,972,757 | B2 | 12/2005 | Arikawa et al. | |
| 2008/0186382 | A1* | 8/2008 | Tauchi | G01S 13/89 342/146 |
| 2011/0001826 | A1* | 1/2011 | Hongo | H04N 7/183 348/148 |
| 2013/0285803 | A1* | 10/2013 | Kang | G07C 5/0866 340/436 |
| 2015/0248730 | A1 | 9/2015 | Pilot et al. | |
| 2016/0093212 | A1* | 3/2016 | Barfield, Jr. | G08G 1/0133 348/144 |
| 2019/0213791 | A1* | 7/2019 | Hanamoto | H04N 5/2224 |
| 2019/0275942 | A1* | 9/2019 | Shimizu | B60R 1/002 |

(Continued)

FOREIGN PATENT DOCUMENTS

| | | | |
|---|---|---|---|
| CN | 112418183 | A | 2/2021 |
| CN | 113538579 | A | 10/2021 |

(Continued)

*Primary Examiner* — Joseph G Ustaris
*Assistant Examiner* — Jimmy S Lee
(74) *Attorney, Agent, or Firm* — Dinsmore & Shohl LLP

(57) ABSTRACT

A camera view share system is provided. The camera view share system includes a road-side unit. The road-side unit includes a controller configured to receive a request for a bird-eye-view map from an ego vehicle, the bird-eye-view map including a plurality of vehicles, transmit the bird-eye-view map to the ego vehicle, receive a selection of a target vehicle among the plurality of vehicles from the ego vehicle, and transmit a camera feed related to the target vehicle to the ego vehicle.

20 Claims, 6 Drawing Sheets

(56) References Cited

U.S. PATENT DOCUMENTS

| | | | | |
|---|---|---|---|---|
| 2020/0042805 | A1* | 2/2020 | Satomi | B60R 1/27 |
| 2020/0196126 | A1* | 6/2020 | Kim | H04W 4/90 |
| 2022/0319192 | A1* | 10/2022 | Tani | G16Y 10/40 |
| 2023/0033706 | A1* | 2/2023 | Sasaki | E02F 9/2054 |
| 2023/0091500 | A1* | 3/2023 | Itsukaichi | H04N 7/181<br>382/103 |
| 2024/0146882 | A1* | 5/2024 | Signell | H04N 7/188 |

FOREIGN PATENT DOCUMENTS

| | | | |
|---|---|---|---|
| CN | 113284366 | B | 5/2022 |
| JP | 2009163583 | A | 7/2009 |

* cited by examiner

SYSTEMS, METHODS, AND NON-TRANSITORY COMPUTER-READABLE MEDIUM FOR SHARING CAMERA VIEWS

TECHNICAL FIELD

The present disclosure relates to systems, methods, and non-transitory computer-readable medium for sharing camera views among a plurality of connected vehicles via a road-side unit.

BACKGROUND

The vehicle sensors of vehicles provide real-time information about the vehicles to drivers, and help better decision-making. Conventional vehicle image sensor systems provide information about surrounding areas using front-view cameras, and rear-view cameras. However, conventional systems provide a limited view while driving. Because of the limited view and not enough information about traffic, it is difficult to make a decision such as whether or not to wait in line, or take the next exit for a different route when the vehicle is in an intersection or a highway.

Accordingly, a need exists for systems, methods, and non-transitory computer-readable mediums that extend the view of the driver of an ego vehicle by sharing the view of other vehicles with the ego vehicle.

SUMMARY

The present disclosure provides systems, methods, and non-transitory computer-readable mediums of sharing camera view. The systems, methods, and non-transitory computer-readable mediums allow a driver of an ego vehicle to choose a target vehicle from a bird-eye-view map and request to receive a camera feed of the target vehicle through a road-side unit. Thus, the systems, methods, and non-transitory computer-readable medium extend the view of the driver of the ego vehicle.

In one or more embodiments, a camera view share system includes a road-side unit. The road-side unit includes a controller configured to receive a request for a bird-eye-view map from a vehicle, the bird-eye-view map including a plurality of vehicles, transmit the bird-eye-view map to the vehicle, receive a selection of a target vehicle among the plurality of vehicles from the vehicle, and transmit a camera feed related to the target vehicle to the vehicle.

In another embodiment, a method of camera view sharing is provided. The method includes receiving a request for a bird-eye-view map from a vehicle, the bird-eye-view map including a plurality of vehicles, transmitting the bird-eye-view map to the vehicle, receiving a selection of a target vehicle among the plurality of vehicles from the vehicle, and transmitting a camera feed related to the targeted vehicle to the vehicle.

In yet another embodiment, a non-transitory computer-readable medium for camera view sharing that, when executed by a controller, causes the controller to receive a request for a bird-eye-view map from a vehicle, the bird-eye-view map including a plurality of vehicles, transmit the bird-eye-view map to the vehicle, receive a selection of a target vehicle among the plurality of vehicles from the vehicle, and transmit a camera feed related to the target vehicle to the vehicle.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

The embodiments disclosed herein include systems, methods, and non-transitory computer-readable mediums for camera view sharing. A driver of an ego vehicle may be provided a bird-eye-view map including a plurality of vehicles and choose a target vehicle from the bird-eye-view map. The driver of the ego vehicle may receive a camera feed of the target vehicle through a road-side unit. Thus, the systems, methods, and non-transitory computer-readable medium extend the view of the driver of the ego vehicle.

Figure 1:
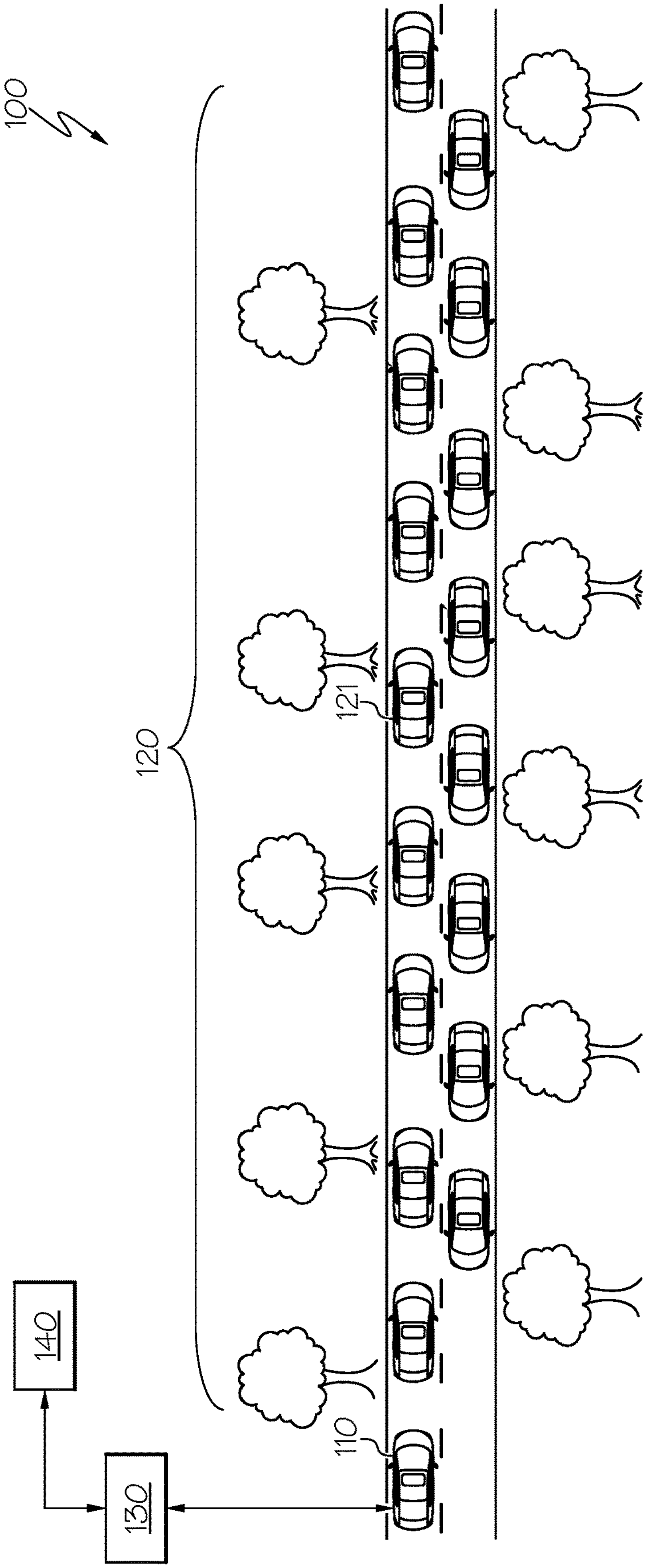
FIG. 1 depicts an exemplary camera view share system, according to one or more embodiments shown and described herein.

FIG. 1 depicts an exemplary camera view share system, according to one or more embodiments shown and described herein.

Referring to FIG. 1, the system 100 of camera view sharing includes a road-side unit 130. The system 100 may further include an ego vehicle 110, and a server 140.

The ego vehicle 110 may be a vehicle including an automobile or any other passenger or non-passenger vehicle such as, for example, a terrestrial, aquatic, and/or airborne vehicle. In some embodiments, the ego vehicle 110 may be an autonomous driving vehicle. The ego vehicle 110 may be an autonomous vehicle that navigates its environment with limited human input or without human input. The ego vehicle 110 may be equipped with internet access and share data with other devices both inside and outside the ego vehicle 110. The ego vehicle 110 may communicate with the road-side unit 130, the server 140, or both, and transmit its data to the road-side unit 130, the server 140, or both. For example, the ego vehicle 110 transmits information about its current location and destination, its environment, information about a current driver, information about a task that it is currently implementing, and the like. The ego vehicle 110 may include an actuator configured to move the ego vehicle 110.

The road-side unit 130 may be a stationary device that communications with vehicles within a particular geographic area. In some embodiments, the road-side unit 130 may be installed in fixed locations or physically integrated with existing infrastructure (e.g., traffic lights). The road-side unit 130 may communicate with the ego vehicle 110, the server 140, or both.

The server 140 may include a cloud server, an edge server, or both. In some embodiments, the server 140 may be an edge server. The edge server may refer an edge device that provides an entry point into a network. The server 140 may communicate with the ego vehicle 110, the road-side unit 130, or both.

Figure 2:
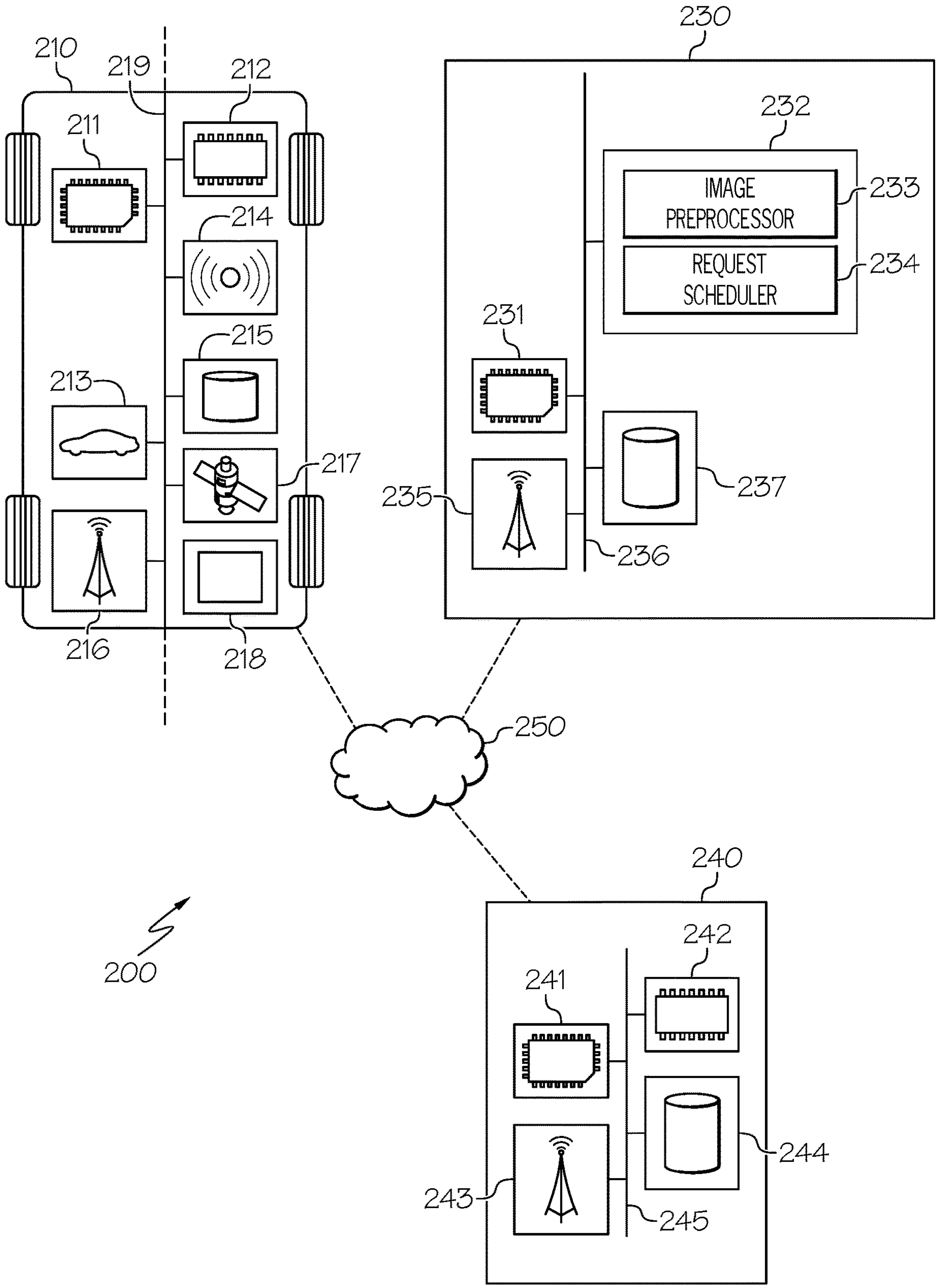
FIG. 2 depicts a schematic diagram of camera view share systems, according to one or more embodiments shown and described herein.

FIG. 2 depicts a schematic diagram of camera view share systems, according to one or more embodiments shown and described herein.

Referring to FIG. 2, the system 200 includes the vehicle system 210, the road-side unit system 230, and the server 240. The vehicle system 210 may include a processor component 211, a memory component 212, a driving assist component 213, a sensor component 214, a vehicle connectivity component 215, a communication module 216, a satellite component 217, and an interface 218. The vehicle system 210 also may include a communication path 219 that communicatively connects the various components of the vehicle system 210.

The processor component 211 may include one or more processors that may be any device capable of executing machine-readable and executable instructions. Accordingly, each of the one or more processors of the processor component 211 may be a controller, an integrated circuit, a microchip, or any other computing device. The processor component 211 is coupled to the communication path 219 that provides signal connectivity between the various components of the connected vehicle. Accordingly, the communication path 219 may communicatively couple any number of processors of the processor component 211 with one another and allow them to operate in a distributed computing environment. Specifically, each processor may operate as a node that may send and/or receive data. As used herein, the phrase “communicatively coupled” means that coupled components are capable of exchanging data signals with one another such as, e.g., electrical signals via a conductive medium, electromagnetic signals via air, optical signals via optical waveguides, and the like.

Accordingly, the communication path 219 may be formed from any medium that is capable of transmitting a signal such as, e.g., conductive wires, conductive traces, optical waveguides, and the like. In some embodiments, the communication path 219 may facilitate the transmission of wireless signals, such as Wi-Fi, Bluetooth®, Near-Field Communication (NFC), and the like. Moreover, the communication path 219 may be formed from a combination of mediums capable of transmitting signals. In one embodiment, the communication path 219 comprises a combination of conductive traces, conductive wires, connectors, and buses that cooperate to permit the transmission of electrical data signals to components such as processors, memories, sensors, input devices, output devices, and communication devices. Accordingly, the communication path 219 may comprise a vehicle bus, such as a LIN bus, a CAN bus, a VAN bus, and the like. Additionally, it is noted that the term “signal” means a waveform (e.g., electrical, optical, magnetic, mechanical, or electromagnetic), such as DC, AC, sinusoidal-wave, triangular-wave, square-wave, vibration, and the like, capable of traveling through a medium.

The memory component 212 is coupled to the communication path 219 and may contain non-transitory computer-readable medium comprising RAM, ROM, flash memories, hard drives, or any device capable of storing machine-readable and executable instructions such that the machine-readable and executable instructions can be accessed by the processor component 211. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory component 212. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The vehicle system 210 may also include a driving assist component 213, and the data gathered by the sensor component 214 may be used by the driving assist component 213 to assist the navigation of the vehicle. The data gathered by the sensor component 214 may also be used to perform various driving assistance including, but not limited to advanced driver-assistance systems (ADAS), adaptive cruise control (ACC), cooperative adaptive cruise control (CACC), lane change assistance, anti-lock braking systems (ABS), collision avoidance system, automotive head-up display, and the like. The information exchanged between vehicles may include information about a vehicle’s speed, heading, acceleration, and other information related to a vehicle state.

The vehicle system 210 also comprises the sensor component 214. The sensor component 214 is coupled to the communication path 219 and communicatively coupled to the processor component 211. The sensor component 214 may include, e.g., LiDAR sensors, RADAR sensors, optical sensors (e.g., cameras), laser sensors, proximity sensors, location sensors (e.g., GPS modules), and the like. In embodiments, the sensor component 214 may monitor the surroundings of the vehicle and may detect other vehicles and/or traffic infrastructure.

The vehicle system 210 also comprises a communication module 216 that includes network interface hardware for communicatively coupling the vehicle system 210 to the road-side unit system 230 or the server 240. The communication module 216 can be communicatively coupled to the communication path 219 and can be any device capable of transmitting and/or receiving data via a network or other communication mechanisms. Accordingly, the communication module 216 can include a communication transceiver for sending and/or receiving any wired or wireless communication. For example, the network interface hardware of the communication module 216 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle system 210 also comprises a vehicle connectivity component 215 that includes network interface hardware for communicatively coupling the vehicle system 210 to other connected vehicles. The vehicle connectivity component 215 can be communicatively coupled to the communication path 219 and can be any device capable of transmitting and/or receiving data via a network or other communication mechanisms. Accordingly, the vehicle connectivity component 215 can include a communication transceiver for sending and/or receiving any wired or wireless communication. For example, the network interface hardware of the vehicle connectivity component 215 may include an antenna, a modem, a LAN port, a Wi-Fi card, a WiMAX card, a cellular modem, near-field communication hardware, satellite communication hardware, and/or any other wired or wireless hardware for communicating with other networks and/or devices.

The vehicle system 210 may connect with one or more other connected vehicles and/or external processing devices (e.g., the road-side unit system 230) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time and/or location-based. In embodiments, a connection between vehicles or between a vehicle and an infrastructure may utilize one or more networks to connect which may be in lieu of, or in addition to, a direct connection (such as V2V or V2X) between the vehicles or between a vehicle and an infrastructure. By way of a non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure. Still other examples include networks using centralized servers and other central computing devices to store and/or relay information between vehicles.

A satellite component 217 is coupled to the communication path 219 such that the communication path 219 communicatively couples the satellite component 217 to other modules of the vehicle system 210. The satellite component 217 may comprise one or more antennas configured to receive signals from global positioning system satellites. Specifically, in one embodiment, the satellite component 217 includes one or more conductive elements that interact with electromagnetic signals transmitted by global positioning system satellites. The received signal is transformed into a data signal indicative of the location (e.g., latitude and longitude) of the satellite component 217, and consequently, the vehicle system 210.

The vehicle system 210 may also include a data storage component that may be included in the memory component 212. The data storage component may store data used by various components of the vehicle system 210. In addition, the data storage component may store data gathered by the sensor component 214, received from the road-side unit system 230, and/or received from other vehicles. The data storage component may include an HD map for autonomous driving of the vehicle system 210. The data storage component may include an HD map downloaded from the road-side unit system 230 or the server 240.

The vehicle system 210 may also include an interface 218. The interface 218 may allow for data to be presented to a human driver and for data to be received from the driver. For example, the interface 218 may include a screen to display information to a driver, speakers to present audio information to the driver, and a touch screen that may be used by the driver to input information. For example, the interface 218 may display a bird-eye-view map or a camera feed of the target vehicle 121 (shown in FIG. 1). As another example, the interface 218 may display a button for a request for a bird-eye-view map and receive an activation of the button by a user. In some embodiments, the vehicle system 210 may include a microphone to receive audio inputs from a user, e.g., a verbal request for a bird-eye-view map.

In some embodiments, the vehicle system 210 may be communicatively coupled to the road-side unit system 230 by a network 250. The network 250 may be a wide area network, a local area network, a personal area network, a cellular network, a satellite network, and the like.

The road-side unit system 230 comprises a processor 231, a memory component 232, a communication module 235, a database 237, and a communication path 236. Each road-side unit component is similar in features to its connected vehicle counterpart, described in detail above (e.g., the processor 231 corresponds to the processor component 211, the memory component 232 corresponds to the memory component 212, the communication module 235 corresponds to the communication module 216, the database 237 corresponds to the database in the memory component 212, and the communication path 236 corresponds to the communication path 219). The memory component 232 may store an image preprocessor 233, and a request scheduler 234. Each of the image preprocessor 233, and the request scheduler 234 may be a program module in the form of operating systems, application program modules, and other program modules stored in the memory component 232.

The image preprocessor 233 may be a program configured to process input data, such as image data, or traffic data, from the plurality of vehicles 120 (shown in FIG. 1) to produce output that is used as input to another program, such as the ego vehicle 110 (shown in FIG. 1), or the server 140 (shown in FIG. 1). For example, the image preprocessor 233 may process data from the plurality of vehicles 120 to produce data used for generating a bird-eye-view map.

The request scheduler 234 may be a program configured to schedule the plurality of requests of a bird-eye-view map from the plurality of vehicles 120 (shown in FIG. 1). The request scheduler 234 may determine priorities among the plurality of requests of bird-eye-view map from the plurality of vehicles 120 (shown in FIG. 1) based on information about the requests. In embodiments, the request scheduler 234 may determine priorities based on the order of receiving the requests. In some embodiments, the request scheduler 234 may determine priorities among the plurality of requests based on urgency. For example, when the road-side unit system 230 receives a first request related to emergency situation and a second request related to non-emergency situation, the road-side unit system 230 determines that the first request takes priority over the second request and selects the first request prior to the second request.

The server 240 includes one or more processors 241, one or more memory modules 242, a communication module 243, a data storage component 244, and a communication path 245. The components of the server 240 may be structurally similar to and have similar functions as the corresponding components of the road-side unit system 230 (e.g., the one or more processors 241 corresponds to the processor 231, the one or more memory modules 242 corresponds to the memory component 232, the communication module 243 corresponds to the communication module 235, the data storage component 244 corresponds to the database 237, and the communication path 245 corresponds to the communication path 236).

The memory modules 242 may store a bird-eye-view map generator (not shown). The bird-eye-view map generator may be a program module in the form of operating system, application program module, and other program module stored in the memory modules 242.

The bird-eye-view map generator may be a program configured to generate the bird-eye-view map. The bird-eye-view map generator may generate the bird-eye-view map based on the camera feeds from the plurality of the vehicles 120 (shown in FIG. 1).

Figure 3A:
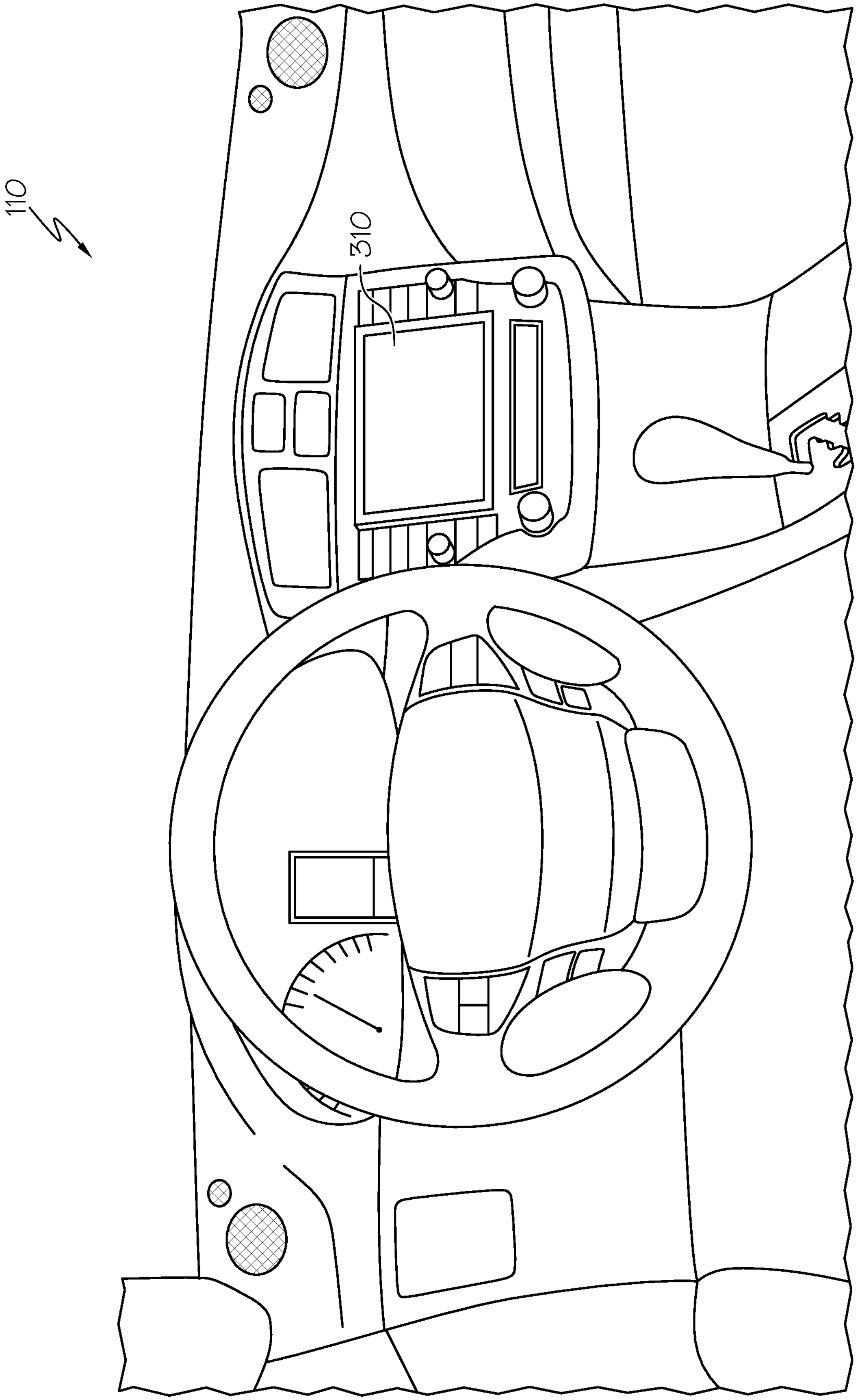
FIGS. 3A-3C schematically depict an exemplary embodiment of camera view share systems, according to one or more embodiments shown and described herein.
Figure 3C:
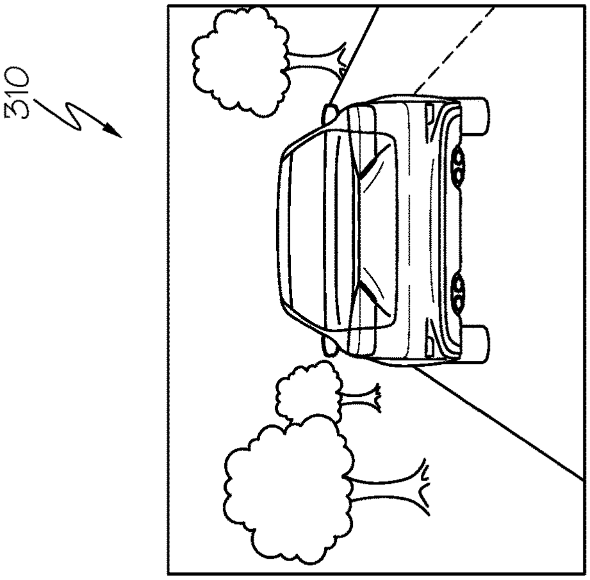
Figure 3B:
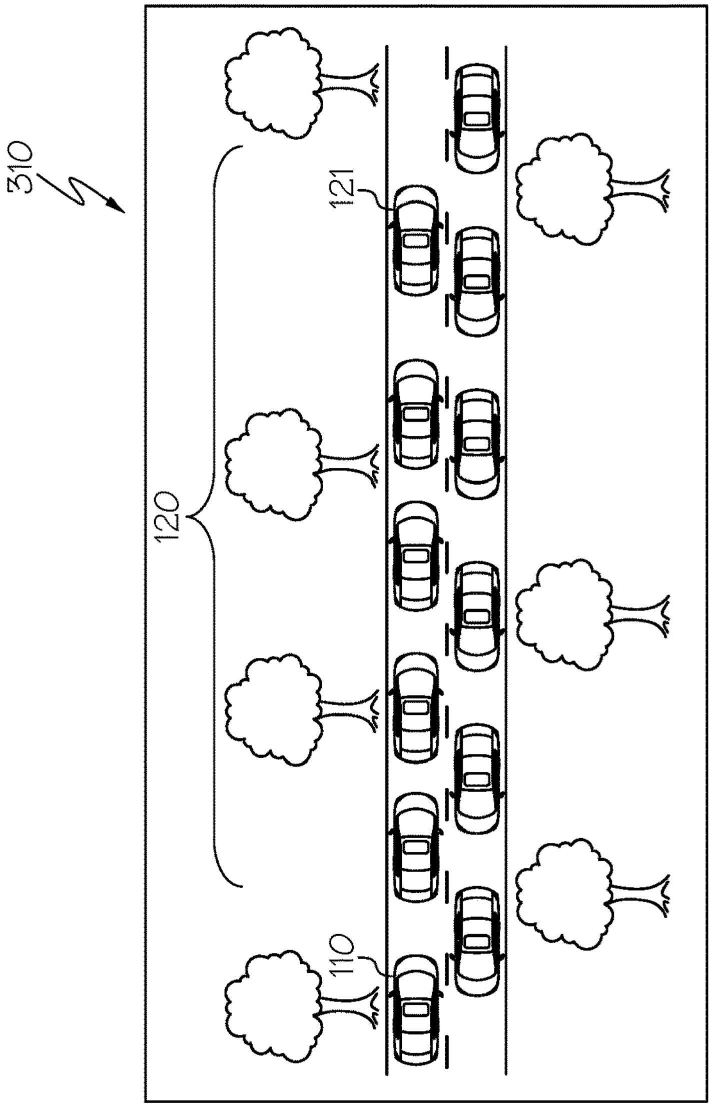

FIGS. 3A-3C schematically depict an exemplary embodiment of camera view share systems, according to one or more embodiments shown and described herein.

Referring to FIGS. 1 and 3A-3C, the road-side unit 130 receives a request for a bird-eye-view map from the ego vehicle 110. FIG. 3A depicts an inside view of the ego vehicle 110 from the perspective of a driver of the ego vehicle 110. For example, the driver of the ego vehicle 110 may request the bird-eye-view map to the road-side unit 130 by pushing a button or touching a display of a device 310 in the ego vehicle 110.

In some embodiments, the road-side unit 130 may receive a plurality of requests of bird-eye-view maps from a plurality of vehicles 120. When the road-side unit 130 receives a plurality of requests of bird-eye-view maps from a plurality of vehicles 120, the road-side unit 130 may determine priorities among the plurality of requests based on information about the requests. In some embodiments, the road-side unit 130 may determine priorities among the plurality of requests based on urgency. The road-side unit 130 may select a request from a vehicle based on the determined priorities. For example, when the road-side unit 130 receive a first request related to emergency situation and a second request related to non-emergency situation, the road-side unit 130 determine that the first request takes priority over the second request and selects the first request prior to the second request.

In some embodiments, when the road-side unit 130 receives the request for the bird-eye-view map, the road-side unit 130 may identify an area where an average speed of vehicles is less than a threshold. For example, an average speed of vehicles is less than a threshold in the traffic jam, in the intersection. The road-side unit 130 may obtain the bird-eye-view map for the identified area.

In some embodiments, when the road-side unit 130 receives the request for the bird-eye-view map, the road-side unit 130 may identify a location of an incident, such as traffic collision including motor vehicle collision, car accident, or car crash. The road-side unit 130 may obtain the bird-eye-view map for an area including the location of the incident.

Referring to FIG. 3B, the bird-eye-view map may refer to a map having an elevated view of an object or location from a steep viewing angle, creating a perspective as if the observer were a bird in flight looking downwards. The bird-eye-view map may be an aerial photograph or a drawing. The bird-eye-view map may include a plurality of vehicles 120. The bird-eye-view map may further include the ego vehicle 110. The bird-eye-view map may further include information about roadside conditions, such as traffic information (e.g., accidents, construction, etc.), weather information, environmental condition, etc. The bird-eye-view map may be generated based on the plurality of camera feeds. In some embodiments, the road-side unit 130 may receive the plurality of camera feeds from the plurality of vehicles 120 and store the plurality of camera feeds in the road-side unit 130. The road-side unit 130 may send the plurality of camera feeds to the server 140, and then the bird-eye-view map is generated by the server 140 based on the plurality of camera feeds. The bird-eye-view map may be sent from the server 140 to the road-side unit 130.

In some embodiments, an area of the bird-eye-view map is within a coverage area of the road-side unit 130. The coverage area may refer to an area where the road-side unit 130 is capable of receiving data from the plurality of vehicles 120 and transmitting the data to the server 140. In some embodiments, the coverage area of the road-side unit 130 may be from 1 meter to hundreds of kilometers. In some embodiments, the area of the bird-eye-view map may be from 1 meter to hundreds of kilometers.

Referring back to FIGS. 1 and 3A-3C, the road-side unit 130 transmits the bird-eye-view map to the ego vehicle 110. In some embodiments, prior to transmitting the bird-eye-view map from the road-side unit 130 to the ego vehicle 110, the road-side unit 130 may determine whether the bird-eye-view map is available. For example, the road-side unit 130 may determine whether the bird-eye-view map is stored in the road-side unit 130. When the road-side unit 130 determines that the bird-eye-view map is available (such as stored in the road-side unit 130), road-side unit 130 may transmit the bird-eye-view map from the road-side unit 130 to the ego vehicle 110. When the road-side unit 130 determines that the bird-eye-view map is not available (such as not stored in the road-side unit 130), the road-side unit 130 may transmit a request for generating the bird-eye-view map to the server 140.

Referring to FIG. 3B, the bird-eye-view map may be displayed on the device 310 in the ego vehicle 110. The device 310 may include an output device of the ego vehicle 110, a display device of the driver, or both. The device 310 may include a navigation device, a smartphone, a smartwatch, a laptop, a tablet computer, a personal computer, a wearable device, or combinations thereof.

Still referring to FIG. 3B, the road-side unit 130 may receive a selection of a target vehicle 121 among the plurality of vehicles 120 from the ego vehicle 110. In some embodiments, the driver of the ego vehicle 110 may select the target vehicle 121 by touching an image of the target vehicle 121 on the bird-eye-view map displayed on the device 310. In some embodiments, the driver of the ego vehicle 110 may select the target vehicle 121 by voice, such as speaking "the second left vehicle on the bird-eye-view map."

In some embodiments, the road-side unit 130 may further receive direction information from the ego vehicle 110. For example, the road-side unit 130 may receive direction information, such as front, rear, left, or right, from the ego vehicle 110. For example, when the driver of the ego vehicle 110 wants to receive the front view of the target vehicle 121, the driver of the ego vehicle 110 may transmit the front direction information to the road-side unit 130 and the road-side unit 130 may receive the front direction information from the ego vehicle 110.

The road-side unit 130 receives a camera feed from the target vehicle 121. In some embodiments, the road-side unit 130 may receive one or more camera feeds from the target vehicle 121. In some embodiments, the road-side unit 130 may receive one or more camera feeds related to a front view, a rear view, a left view, or a right view, from the target vehicle 121.

Referring to FIG. 3C, the road-side unit 130 may transmit a camera feed related to the target vehicle 121 to the ego vehicle 110. The camera feed may include information about roadside conditions, such as traffic information (e.g., accidents, construction, etc.), weather information, environmental condition, etc. The camera feed may include the information related to roadway objects, such as one or more vehicles, and a position of one or more vehicles on the road. The camera feed may include one or more vehicles on the road, but less number of vehicles in the bird-eye-view map.

In some embodiments, the road-side unit 130 may transmit a camera feed corresponding to the direction information to the ego vehicle 110. For example, when the road-side unit 130 receives a front view request from the ego vehicle 110, the road-side unit 130 receives the front view of camera feed of the target vehicle 121 and then transmits the front view of camera feed of the target vehicle 121 to the ego vehicle 110. In some embodiments, the road-side unit 130 may transmit the plurality of camera feeds, such as a front view, a rear view, a left view, and a right view, received from the target vehicle 121 to the ego vehicle 110.

Still referring to FIG. 3C, the camera feed related to the target vehicle 121 may be displayed on the device 310 in the ego vehicle 110. The device 310 may include an output device of the ego vehicle 110, a display device of the driver, or both. When the camera feed related to the target vehicle 121 includes more than one camera feed, such as front view, rear view, left view, and right view, the device 310 in the ego vehicle 110 may display the plurality of camera feeds of the target vehicle 121.

In some embodiments, the plurality of camera feeds, such as a front view, a rear view, a left view, and a right view, received from the target vehicle 121 may be displayed on the device 310 in the ego vehicle 110.

In some embodiments, when the driver of the ego vehicle 110 wants to receive the camera feeds from other vehicles, the road-side unit 130 may receive a request for the bird-eye-view map, transmit the bird-eye-view map to the ego vehicle 110, and then receive a selection of other vehicles. The road-side unit 130 may send a camera feed received from other vehicles to the ego vehicle 110.

Figure 4:
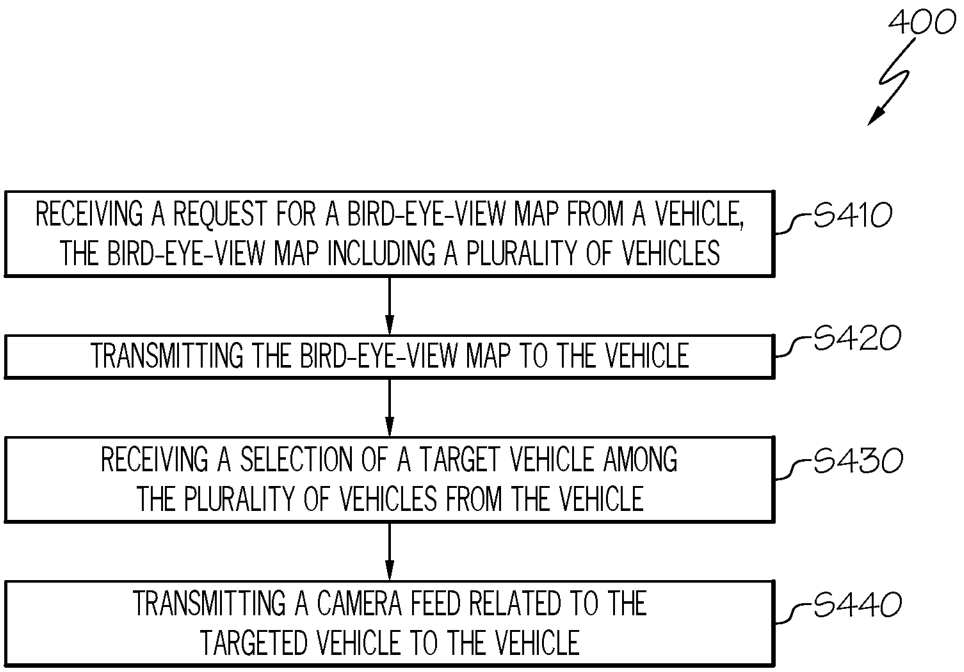
FIG. 4 depicts a flowchart for methods of camera view sharing, according to one or more embodiments shown and described herein.

Referring now to FIG. 4, a flowchart 400 for methods of camera view sharing that may be performed by the system of FIG. 1 is depicted.

Referring to FIG. 4, in step S410, the controller of the road-side unit 130 receives a request for a bird-eye-view map from the ego vehicle 110. For example, by referring to FIG. 3A, the driver of the ego vehicle 110 may request the bird-eye-view map to the road-side unit 130 by pushing a button or touching a display of a device in the ego vehicle 110. For example, the driver of the ego vehicle 110 may request the bird-eye-view map to the road-side unit 130 by voice, such as "please provide the bird-eye-view map." In some embodiments, the request for the bird-eye-view map may include location information, e.g., 1 mile ahead.

Referring to FIG. 4, in step S420, the controller of the road-side unit 130, the road-side unit 130 transmits the bird-eye-view map to the ego vehicle 110. In some embodiments, prior to transmitting the bird-eye-view map from the road-side unit 130 to the ego vehicle 110, the controller of the road-side unit 130 may determine whether the bird-eye-view map is available. For example, the controller of the road-side unit 130 may determine whether the bird-eye-view map is stored in the road-side unit 130. When the controller of the road-side unit 130 determines that the bird-eye-view map is available (such as stored in the road-side unit 130), the controller of road-side unit 130 may transmit the bird-eye-view map from the road-side unit 130 to the ego vehicle 110. When the controller of the road-side unit 130 determines that the bird-eye-view map is not available (such as not stored in the road-side unit 130), the controller of the road-side unit 130 may transmit a request for generating the bird-eye-view map to the server 140. In response to receiving the request for generating the bird-eye-view map, the controller of the server 140 may generate the bird-eye-view map the plurality of camera feeds. In some embodiments, the road-side unit 130 obtains a bird-eye-view map based on location information included in the bird-eye-view map. For example, if the location information indicates 1 mile ahead of the ego vehicle 110, the road-side unit 130 obtains a bird-eye-view map corresponding to 1 mile ahead of the ego vehicle 110.

The controller of the ego vehicle 110 may display the bird-eye-view map on the device 310 in the ego vehicle 110. The device 310 may include an output device of the ego vehicle 110, a display device of the driver of the ego vehicle 110, or both.

Referring to FIG. 4, in step S430, the controller of the road-side unit 130 may receive a selection of the target vehicle 121 among the plurality of vehicles 120 from the ego vehicle 110. In some embodiments, the driver of the ego vehicle 110 may select the target vehicle 121 by touching an image of the target vehicle 121 on the bird-eye-view map displayed on the device 310.

In some embodiments, the controller of the road-side unit 130 receives the camera feed from the target vehicle 121. In some embodiments, the road-side unit 130 may receive one or more camera feeds, such as a front view, a rear view, a left view, and a right view, from the target vehicle 121.

Referring to FIG. 4, in step S440, the controller of the road-side unit 130 may transmit the camera feed related to the target vehicle 121 to the ego vehicle 110. The controller of the road-side unit 130 may transmit the camera feed received from to the target vehicle 121 to the ego vehicle 110. By referring to FIG. 3C, the camera feed related to the target vehicle 121, such as received from the target vehicle 121, may be displayed on the device 310 in the ego vehicle 110. The device 310 may include an output device of the ego vehicle 110, a display device of the driver of the ego vehicle 110, or both.

In some embodiments, when the driver of the ego vehicle 110 wants to receive the camera feeds from other vehicles, the controller of the road-side unit 130 may receive a request the bird-eye-view map from the ego vehicle 110, transmit the bird-eye-view map to the ego vehicle 110, and then receive a selection of other vehicles. The controller of the road-side unit 130 may send a camera feed received from other vehicles to the ego vehicle 110.

Figure 5:
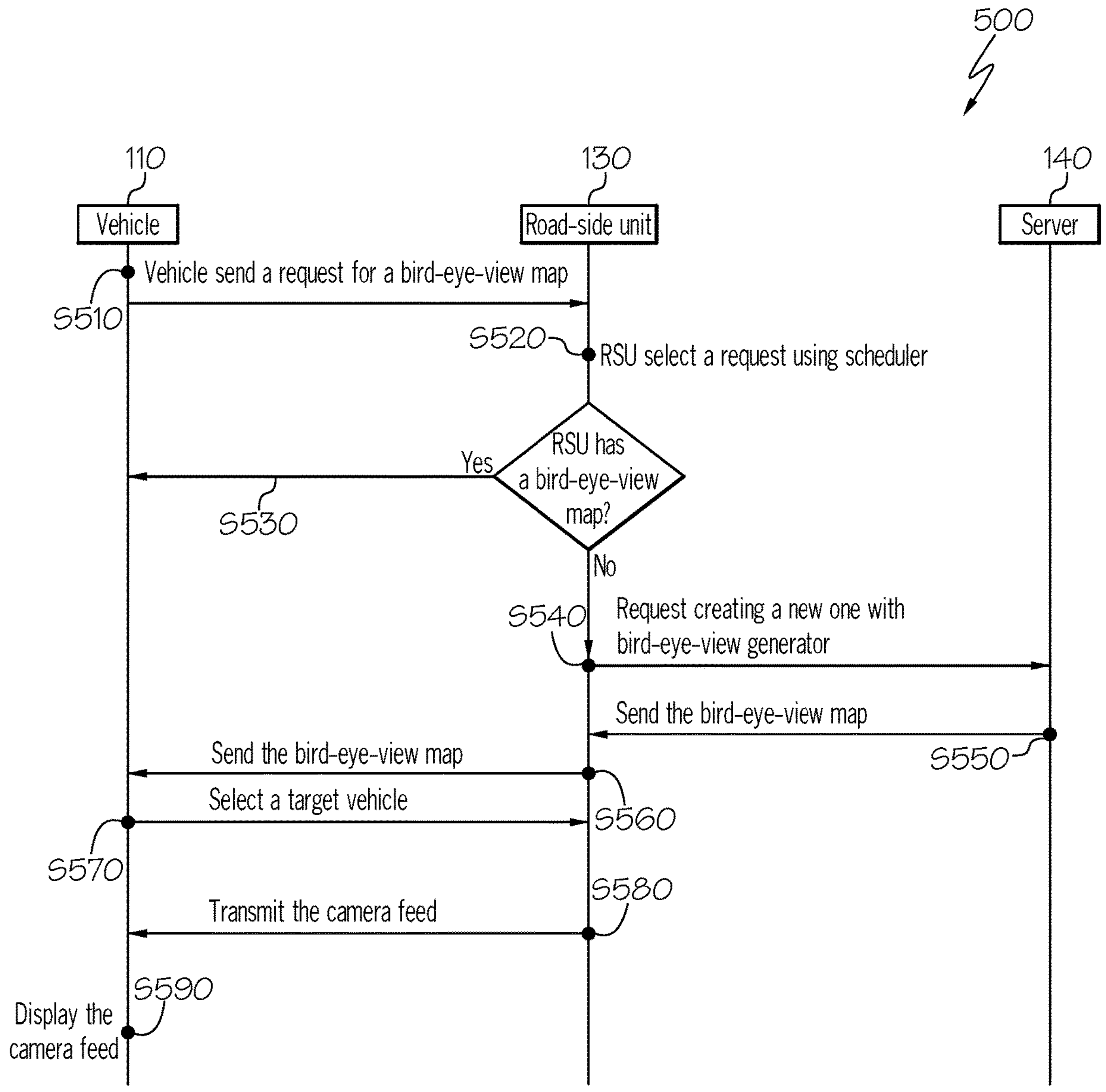
FIG. 5 depicts a flowchart for methods of camera view sharing, according to one or more embodiments shown and described herein.

Referring now to FIG. 5, a flowchart 500 for methods of camera view sharing that may be performed by the system of FIG. 1 is depicted.

Referring to FIGS. 1, 2, and 5, in step S510, the controller of the ego vehicle 110 may send the request for the bird-eye-view map to the road-side unit 130. For example, the driver of the ego vehicle 110 may request the bird-eye-view map to the road-side unit 130 by pushing a button or touching a display of a device in the ego vehicle 110. For example, the driver of the ego vehicle 110 may request the bird-eye-view map to the road-side unit 130 by voice, such as "please provide the bird-eye-view map."

Still referring to FIGS. 1, 2, and 5, in step S520, when the road-side unit 130 may receive a plurality of requests of bird-eye-view maps from a plurality of vehicles 120, the controller of the road-side unit 130 may select a request using a request scheduler 234. When the road-side unit 130 receives a plurality of requests of bird-eye-view maps from a plurality of vehicles 120, the road-side unit 130 may determine priorities among the plurality of requests based on information about the requests. In some embodiments, the road-side unit 130 may determine priorities among the plurality of requests based on urgency. The road-side unit 130 may select the request from the vehicle based on the determined priorities. For example, when the road-side unit 130 receives a first request related to emergency situation and a second request related to non-emergency situation, the road-side unit 130 determines that the first request takes priority over the second request and selects the first request prior to the second request.

Still referring to FIGS. 1, 2, and 5, the controller of the road-side unit 130 may determine whether the road-side unit 130 has the bird-eye-view map. In step S530, when the controller of the road-side unit 130 determines that the road-side unit 130 stores the bird-eye-view map, the controller of the road-side unit 130 may send the bird-eye-view map to the ego vehicle 110. In step S540, when the controller of the road-side unit 130 determines that the road-side unit 130 does not store the bird-eye-view map, the controller of the road-side unit 130 may transmit a request for generating the bird-eye-view map to the server 140. In some embodiments, in response to the request for generating the bird-eye-view map, the bird-eye-view map is generated by the server 140, such as the bird-eye-view map generator, based on the plurality of camera feeds.

Still referring to FIGS. 1, 2, and 5, in step S550, the bird-eye-view map may be sent from the server 140 to the road-side unit 130. For example, in response to a request creating the bird-eye-view map, the bird-eye-view map is generated by the server 140, such as the bird-eye-view map generator, based on the plurality of camera feeds, and then sent from the server 140 to the road-side unit 130.

Still referring to FIGS. 1, 2, and 5, in step S560, after receiving the bird-eye-view map from the server 140, the controller of the road-side unit 130 may send the bird-eye-view map to the ego vehicle 110. In some embodiments, when the controller of the road-side unit 130 determines that the road-side unit 130 does not store the bird-eye-view map, the controller of the road-side unit 130 may receive the bird-eye-view map from the server 140, and then send the bird-eye-view map to the ego vehicle 110.

By referring to FIG. 3B, the bird-eye-view map may be displayed on the device 310 in the ego vehicle 110. The device 310 may include an output device of the ego vehicle 110, a display device of the driver of the ego vehicle 110, or both.

Still referring to FIGS. 1, 2, and 5, in step S570, the controller of the road-side unit 130 may receive a selection of the target vehicle 121 among the plurality of vehicles 120 from the ego vehicle 110. By referring to FIG. 3B, the driver of the ego vehicle 110 may select the target vehicle 121 by touching an image of the target vehicle 121 on the bird-eye-view map. In some embodiments, the driver of the ego vehicle 110 may select the target vehicle 121 by voice, such as speaking "the second left vehicle on the bird-eye-view map."

Still referring to FIGS. 1, 2, and 5, in step S580, the controller of the road-side unit 130 may transmit a camera feed related to the target vehicle 121 to the ego vehicle 110. In some embodiments, the controller of the road-side unit 130 may transmit the plurality of camera feeds, such as a front view, a rear view, a left view, and a right view, received from the target vehicle 121 to the ego vehicle 110.

Still referring to FIGS. 1, 2, and 5, in step S590, the controller of the ego vehicle 110 may display the camera feed related to the target vehicle 121. By referring to FIG. 3C, the camera feed related to the target vehicle 121 is displayed on the device 310 in the ego vehicle 110. The device 310 may include an output device of the ego vehicle 110, a display device of the driver, or both. In some embodiments, the controller of the ego vehicle 110 may display the plurality of camera feeds, such as a front view, a rear view, a left view, and a right view, received from the target vehicle 121 on the device 310 in the ego vehicle 110.

In some embodiments, when the driver of the ego vehicle 110 wants to receive the camera feeds from other vehicles, the controller of the road-side unit 130 may receive a request the bird-eye-view map from the ego vehicle 110, transmit the bird-eye-view map to the ego vehicle 110, and then receive a selection of other vehicles. The controller of the road-side unit 130 may send a camera feed received from other vehicles to the ego vehicle 110.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A camera view share system comprising a road-side unit comprising a controller configured to:

receive a request for a bird-eye-view map from an ego vehicle, the bird-eye-view map including a plurality of vehicles;

transmit the bird-eye-view map to the ego vehicle;

receive, from the ego vehicle, a selection of a target vehicle that is one of the plurality of vehicles included in the bird-eye-view map, the selection of the target vehicle provided by a driver of the ego vehicle;

receive a plurality of camera feeds from the target vehicle, each of the plurality camera feeds related to a different view of the target vehicle;

receive, from the ego vehicle, a request for a directional view of the target vehicle; and transmit, to the ego vehicle, a camera feed among the plurality of camera feeds, wherein the camera feed is matched with the requested directional view of the target vehicle.

2. The system according to claim 1, wherein the controller is further configured to: receive a plurality of requests from a plurality of vehicles; and determine priorities among the plurality of requests based on information about the requests; and select the request from the ego vehicle based on the determined priorities.

3. The system according to claim 1, wherein the controller is further configured to:

identify an area where an average speed of vehicles is less than a threshold in response to receiving the request for the bird-eye-view map; and obtain the bird-eye-view map for the identified area.

4. The system according to claim 1, wherein the controller is further configured to:

identify a location of an incident in response to receiving the request for the bird-eye-view map; and obtain the bird-eye-view map for an area including the location of the incident.

5. The system according to claim 1, wherein an area of the bird-eye-view map is within a coverage area of the road-side unit.

6. The system according to claim 1, wherein the controller is further configured to: determine whether the bird-eye-view map is available; and transmit, to a server, a request for generating the bird-eye-view map in response to determining that the bird-eye-view map is not available.

7. The system according to claim 1, wherein the controller is further configured to: receive a plurality of camera feeds from the plurality of vehicles;

store the plurality of camera feeds in the road-side unit; and send the plurality of camera feeds from the road-side unit to a server.

8. The system according to claim 7, further comprising the server comprising a controller configured to:

generate the bird-eye-view map based on the plurality of camera feeds in the server.

9. The system according to claim 8, wherein the controller of the server is further configured to send the bird-eye-view map from the server to the road-side unit.

10. The system according to claim 1, further comprising the ego vehicle comprising a controller configured to:

display the camera feed on a display device of the ego vehicle.

11. A method of sharing a camera view comprising:

receiving a request for a bird-eye-view map from an ego vehicle, the bird-eye-view map including a plurality of vehicles;

transmitting the bird-eye-view map to the vehicle;

receiving, from the ego vehicle, a selection of a target vehicle that is one of the plurality of vehicles included in the bird-eye-view map, the selection of the target vehicle provided by a driver of the ego vehicle;

receiving a plurality of camera feeds from the target vehicle, each of the plurality camera feeds related to a different view of the target vehicle;

receiving, from the ego vehicle, a request for a directional view of the target vehicle; and transmitting, to the ego vehicle, a camera feed among the plurality of camera feeds, wherein the camera feed is matched with the requested directional view of the targeted vehicle.

12. The method according to claim 11, further comprising: receiving a plurality of requests from a plurality of vehicles; and determining priorities among the plurality of requests based on information about the requests; and selecting the request from the ego vehicle based on the determined priorities.

13. The method according to claim 11, further comprising:

identifying an area where an average speed of vehicles is less than a threshold in response to receiving the request for the bird-eye-view map; and obtaining the bird-eye-view map for the identified area.

14. The method according to claim 11, further comprising:

identifying a location of an incident in response to receiving the request for the bird-eye-view map; and obtaining the bird-eye-view map for an area including the location of the incident.

15. The method according to claim 11, wherein an area of the bird-eye-view map is within a coverage area of a road-side unit communicating with the ego vehicle.

16. The method according to claim 11, further comprising: determining whether the bird-eye-view map is available; and transmitting, to a server, a request for generating the bird-eye-view map in response to determining that the bird-eye-view map is not available.

17. The method according to claim 11, further comprising:

receiving a plurality of camera feeds from the plurality of vehicles; storing the plurality of camera feeds in a road-side unit; and sending the plurality of camera feeds from the road-side unit to a server.

18. A non-transitory computer-readable medium storing programs that, when executed by a controller, cause the controller to:

receive a request for a bird-eye-view map from an ego vehicle, the bird-eye-view map including a plurality of vehicles;

transmit the bird-eye-view map to the ego vehicle;

receive, from the ego vehicle, a selection of a target vehicle that is one of the plurality of vehicles included in the bird-eye-view map, the selection of the target vehicle provided by a driver of the ego vehicle;

receive a plurality of camera feeds from the target vehicle, each of the plurality camera feeds related to a different view of the target vehicle;

receive, from the ego vehicle, a request for a directional view of the target vehicle; and transmit, to the ego vehicle, a camera feed among the plurality of camera feeds, wherein the camera feed is matched with the directional view of the target vehicle.

19. The system according to claim 1, wherein:

the bird-eye-view map is displayed on a display device of the ego vehicle; and the selection of the target vehicle is made by the driver of the ego vehicle touching on the display device.

20. The system according to claim 1, wherein the controller is further configured to:

receive a selection of another target vehicle among the plurality of vehicles from the ego vehicle; and transmit a camera feed related to the another target vehicle to the ego vehicle.

* * * * *